(12) United States Patent
Bourgeois

(10) Patent No.: US 6,361,690 B1
(45) Date of Patent: Mar. 26, 2002

(54) EXTENDED AREA FILTER BASKET ASSEMBLY AND FILTER BAG THEREFOR

(76) Inventor: Edmund Bernard Bourgeois, 3930 St. James Ct., Shelby Township, MI (US) 48316

( * ) Notice: Subject to any disclaimer, the term of this patent is extended or adjusted under 35 U.S.C. 154(b) by 0 days.

(21) Appl. No.: 09/417,936

(22) Filed: Oct. 13, 1999

Related U.S. Application Data

(60) Provisional application No. 60/104,033, filed on Oct. 13, 1998, and provisional application No. 60/136,534, filed on May 28, 1999.

(51) Int. Cl.[7] ............................................. B01D 29/27
(52) U.S. Cl. .................. 210/232; 210/315; 210/338; 210/342; 210/452; 210/455; 210/477; 210/497.01; 210/498
(58) Field of Search ............................. 210/315, 323.2, 210/335, 337, 338, 339, 342, 452, 455, 477, 497.01

(56) References Cited

U.S. PATENT DOCUMENTS

| | | | |
|---|---|---|---|
| 2,545,769 A | 3/1951 | De Haven | 210/170 |
| 2,580,209 A | 12/1951 | Wiley | 210/94 |
| 2,763,373 A | 9/1956 | Pearce | 210/148 |
| 4,081,379 A * | 3/1978 | Smith | 210/232 |
| 4,193,780 A | 3/1980 | Cotton, Jr. et al. | 55/378 |
| 4,447,326 A | 5/1984 | Riede et al. | 210/321.3 |
| 4,496,459 A * | 1/1985 | Rosaen | 210/310 |
| 4,498,989 A | 2/1985 | Miyakawa et al. | 210/450 |
| 4,536,228 A * | 8/1985 | Treharne | 148/5.15 R |
| 4,642,089 A | 2/1987 | Zupkas et al. | 604/4 |
| 4,701,259 A | 10/1987 | Rosaen | 210/450 |
| 5,645,721 A | 7/1997 | Carroll, Jr. | 210/315 |
| 5,782,791 A | 7/1998 | Peterson et al. | 604/4 |
| 5,910,247 A * | 6/1999 | Outterside | 210/487 |

* cited by examiner

Primary Examiner—Matthew O. Savage
(74) Attorney, Agent, or Firm—Bliss McGlynn & Nolan, PC

(57) ABSTRACT

A filter assembly includes a filter vessel having an inlet, an outlet, and defining a filter chamber therebetween. A basket assembly is removably supported within said filter chamber and has a diameter less than the diameter of the filter chamber so as to define an annular flow path about the basket assembly. The basket assembly includes an outer, permeable member and an inner, permeable member having a diameter which is less than the diameter of the outer, permeable member such that the inner, permeable member is received with in the outer, permeable member so as to define an annular space therebetween and an inner flow path. The basket assembly supports a bag-type filter over both the inner and outer permeable members bounding the annular space therebetween. The bag-type filter includes a first portion having a first, larger diameter and a second portion having a second, reduced diameter. A transition portion is disposed between the first and second portions of the bag-type filter.

20 Claims, 7 Drawing Sheets

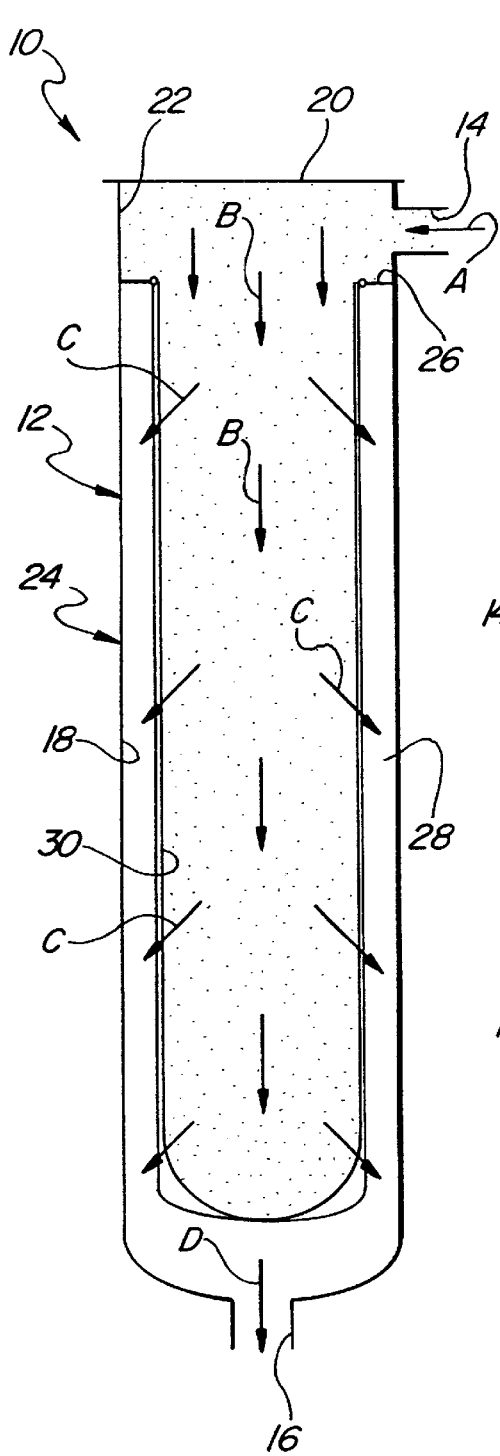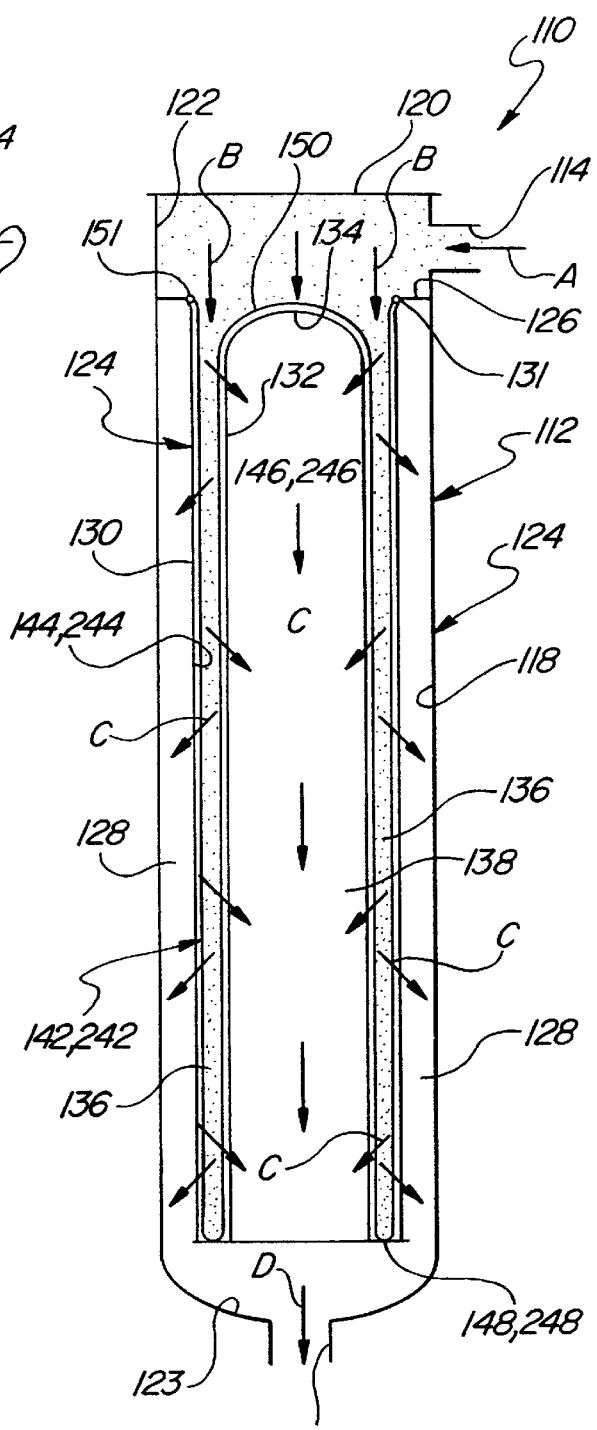
FIG-1
PRIOR ART
FIG-2

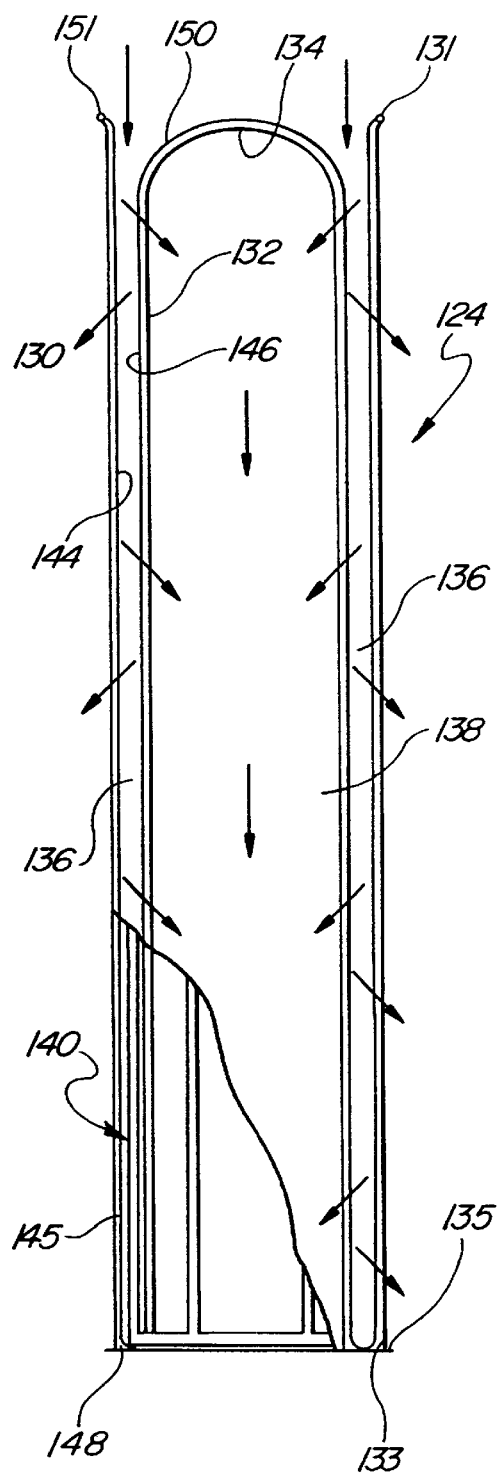
FIG-3
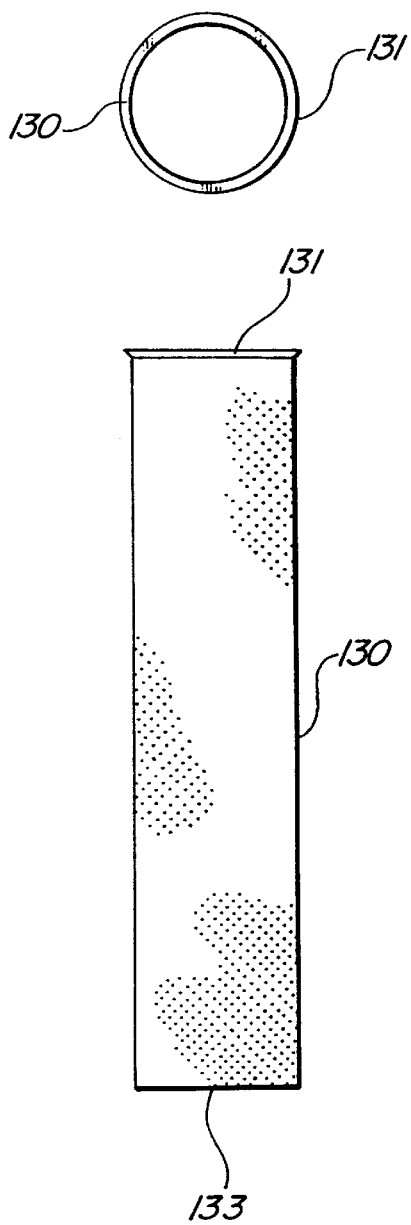
FIG-4A
FIG-4

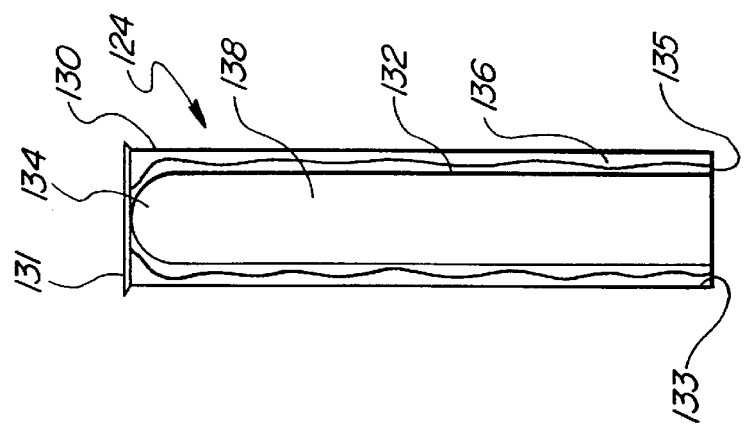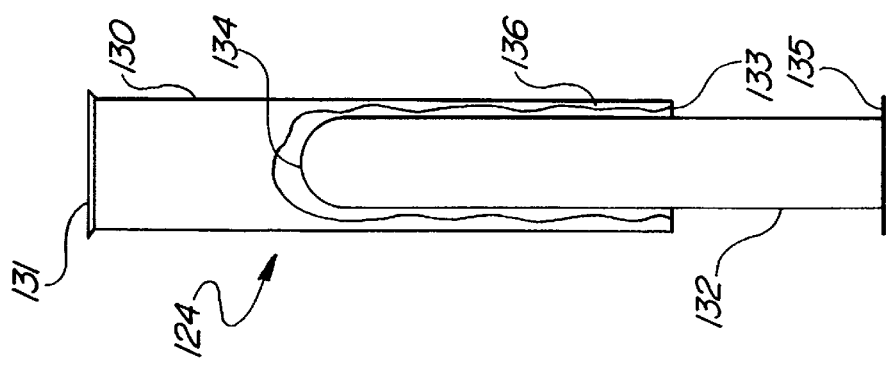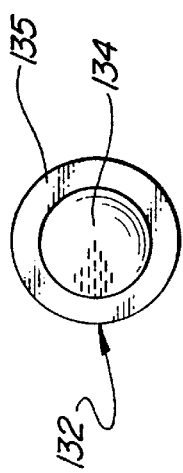

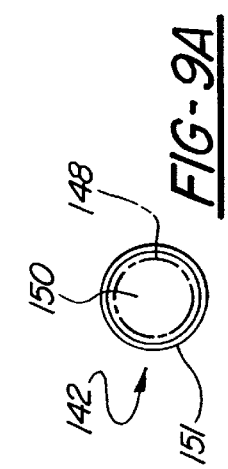
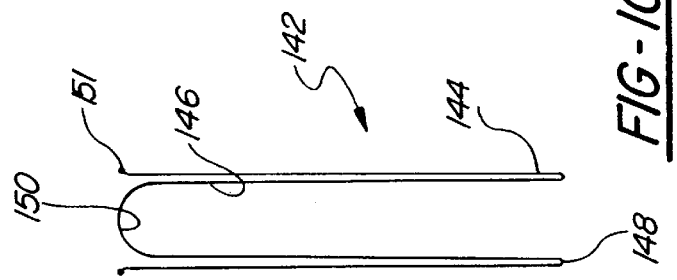
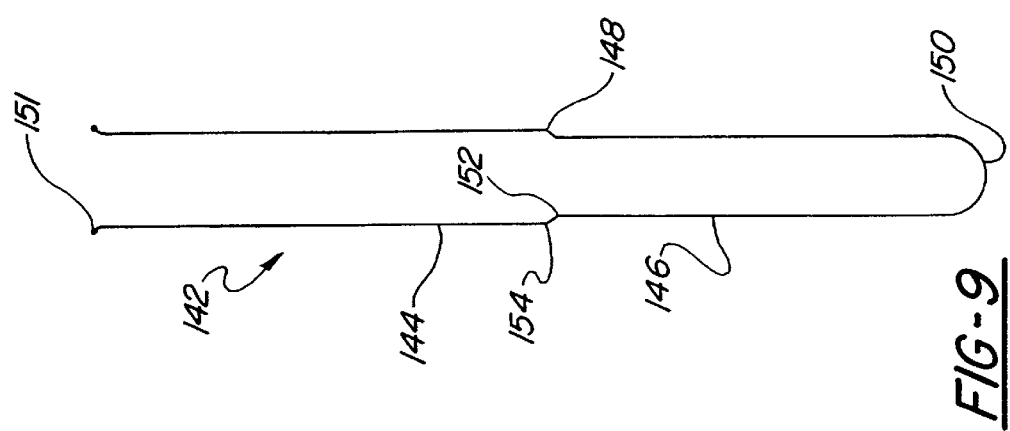
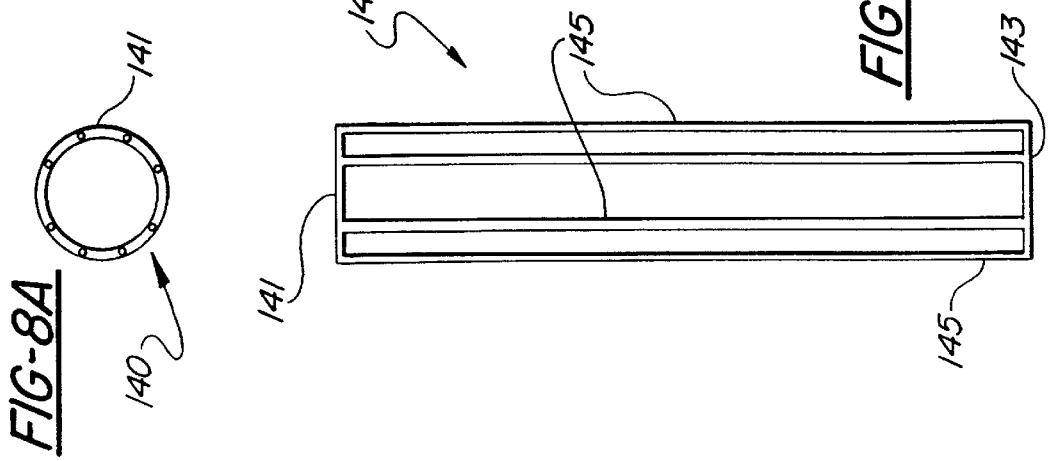

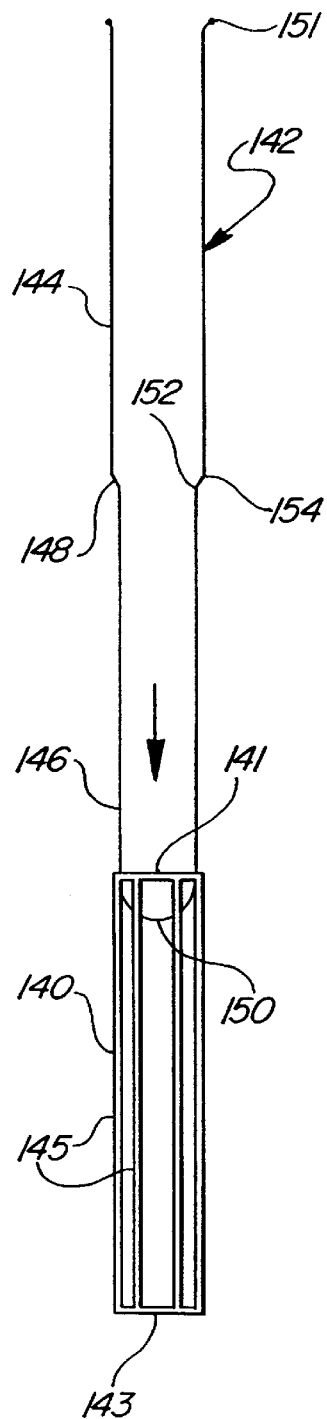
FIG-11
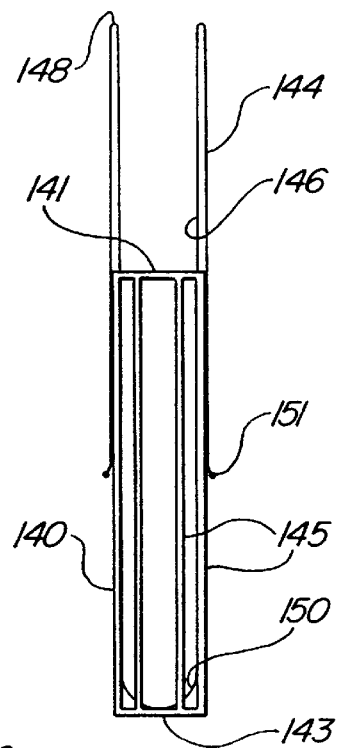
FIG-12
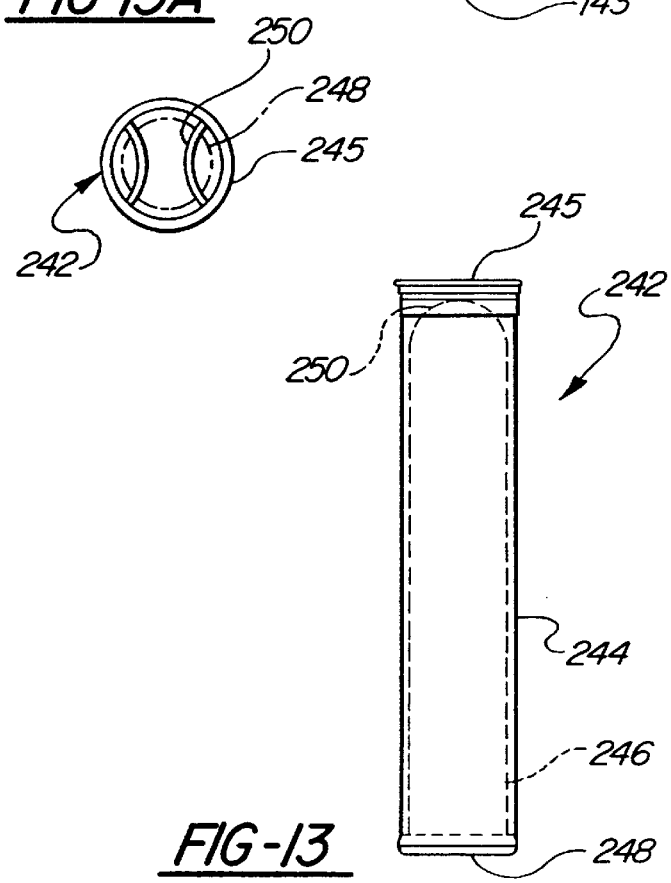
FIG-13A
FIG-13

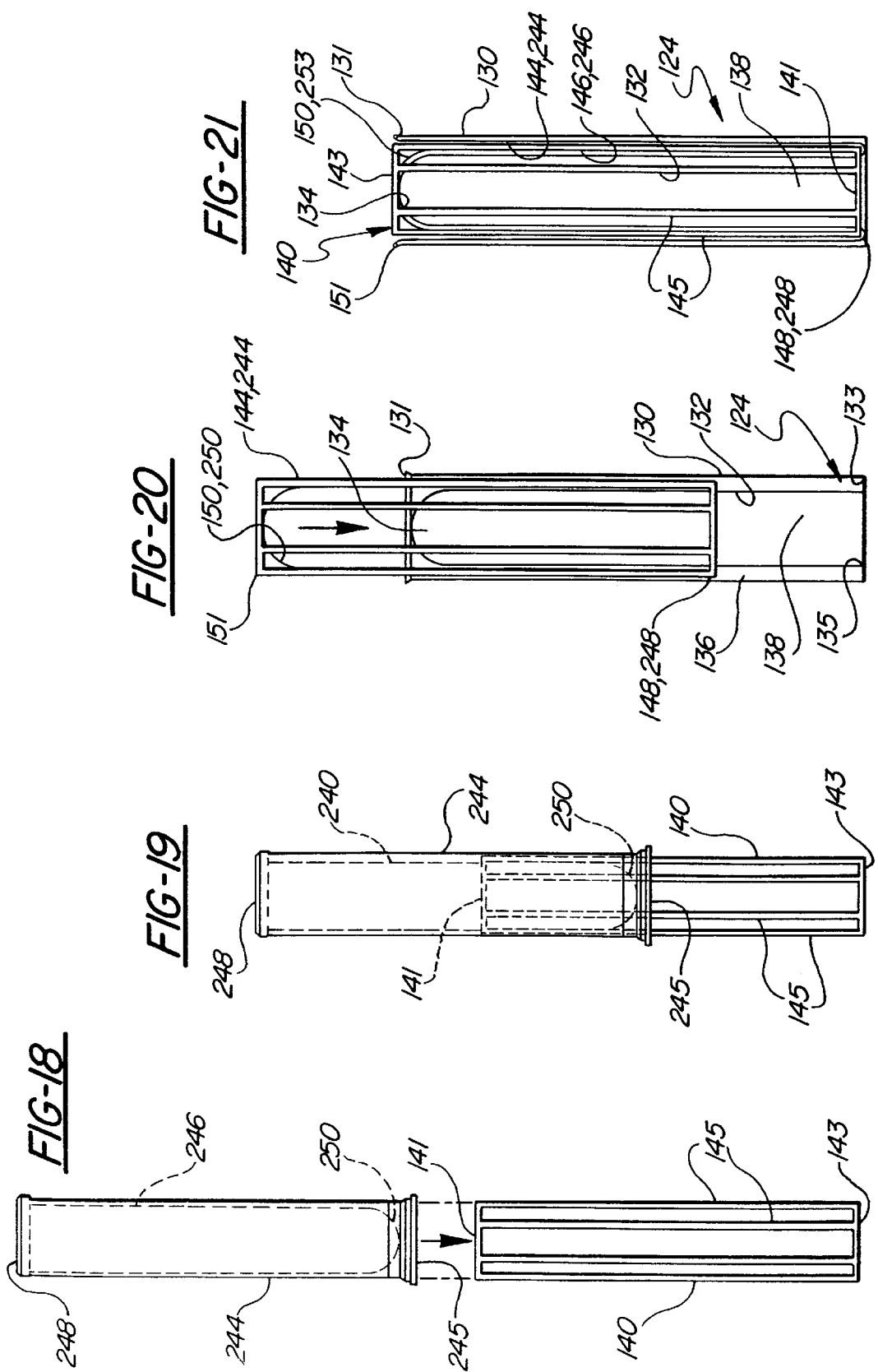

EXTENDED AREA FILTER BASKET ASSEMBLY AND FILTER BAG THEREFOR

This application claims the benefit of priority from provisional patent application Ser. No. 60/104,033, filed Oct. 13, 1998 and Ser. No. 60/136,534, filed May 28, 1999.

BACKGROUND OF THE INVENTION

1. Field of the Invention

The present invention relates, generally, to filters for removing particulate matter from fluid and, more specifically, to bag filters of the type which are supported by a permeable basket which, in turn, is usually positioned in a housing or vessel through which the fluid to be filtered is passed.

2. Background of the Invention

A conventional filter assembly of the type having a basket which supports a bag filter and generally known in the related art is shown at 10 in FIG. 1. The conventional assembly 10 includes a vessel 12 having an inlet 14, an outlet 16 and a substantially cylindrical filter chamber 18 defined therebetween. A cover 20 is removably mounted to the otherwise open top 22 of the vessel 12. A permeable, filter basket 24 is received in the chamber 18 through the top 22 of the vessel 12 and may be supported by a peripheral flange 26 extending radially inward from the inner side wall of the chamber 18. The basket 24 has a diameter which is less than the diameter of the chamber 18 and, together, they define an annular flow passage 28 therebetween. A cylindrical bag-like filter element 30 is supported by the basket 24 in the filter chamber 18. The filter element 30 may be manufactured from needled felt, meshes or any other material which provides a mechanical straining effect on the fluid.

In operation, dirty fluid shown shaded in FIG. 1 enters the chamber 18 through the inlet 14 of the vessel 12 as indicated by arrows A and flows into the filter element 30 (as indicate by arrows B) which is supported by the permeable basket 24. The fluid passes through the bag-type filter element 30, as indicated by the arrows C, and is thereby cleaned. Clean fluid exits the chamber through the outlet 16, as indicated by the arrows D. During this filtering process, the basket 24 does not fill up with particulate. Rather, the bag-like filter element 30 becomes coated with the particulate and other unwanted matter. The bag filter 30 must be replaced at specific intervals which can vary depending upon the application and the purification of the fluid that is required. An increase in the back pressure through the vessel 12 is often used as an indicator that the filter must be changed.

Filter assemblies of this type are often employed in industrial environments to filter water, oil, water soluble oil, paint as well as consumable fluids such as soft drinks and liquor. Another example of a conventional filter assembly of this type is shown in U.S. Pat. No. 4,701,259 issued to Rosaen on Oct. 20, 1987.

Ultimately, the useful life of the bag-type filter elements is determined by the surface area of the filter. The larger the surface area, generally speaking, the longer the useful life of the filter. While relatively inexpensive to replace, bag-type filter systems in the past have suffered from the disadvantage that, in certain applications, the filter elements must be replaced often—sometimes more than once a production shift.

In recognition of this deficiency, it has been proposed to arrange two filters in series in a given vessel or chamber. However, this proposed solution does not result in twice the useful life of the filter element. Furthermore, the pressure drop across a vessel having two filters in series is approximately twice that of a system employing a single filter element.

It has also been proposed to employ a pleated filter element in this environment. Pleated filter elements provide a much higher filter surface area when compared with bag-type filter elements. This results in a longer useful life of the filter element. However, pleated filter elements of the related art suffer from the disadvantage that they are many times more expensive than the bag-type filter elements. Accordingly, in many manufacturing environments where reducing operational costs is paramount, pleated filter elements have not been adopted.

Thus, there remains a need in the art for a basket filter assembly which employs an inexpensive bag-type filter element with good filtering properties, low pressure drop and having a relatively long useful life.

SUMMARY OF THE INVENTION

The present invention overcomes the disadvantages in the related art in a filter assembly including a filter vessel having an inlet and an outlet and defining a filter chamber therebetween. A basket assembly is removably supported within the filter chamber. The basket assembly has a diameter less than the diameter of the filter chamber so as to define an annular flow passage about the basket assembly. The basket assembly includes an outer permeable member and an inner permeable member having a diameter which is less than the diameter of the outer permeable member such that the inner permeable member is received within the outer permeable member so as to define an annular space therebetween and inner flow path. The basket assembly is capable of supporting a bag type filter over both the inner and outer permeable members bounding the annular space therebetween. To that end, the bag type filter includes a first portion having a first, larger diameter and a second portion having a second, reduced diameter. In addition, the bag type filter has a transition portion disposed between the first and second portions. The bag type filter is specifically adapted to be received on the basket assembly and be supported by the outer and inner permeable members in the annular space therebetween.

Accordingly, the filter assembly of the present invention provides a filter surface area which is much larger than conventional filter assemblies known in the related art. Thus, the present invention may be used to double the useful life of the bag-type filter without any substantial increase in cost or to double the flow rate through the vessel for the same useful life of a conventional filter and, while at the same time in either case, reducing the pressure drop of the fluid through the vessel. Alternatively, the present invention facilitates a reduction in size of the vessel while maintaining the same respective useful life of the filter. Smaller vessels reduce the plant space required for these filtering systems. Finally, the bag-type filter of the present invention is inexpensive, cost efficient and is easy to use in the field.

BRIEF DESCRIPTION OF THE DRAWINGS

Other advantages of the invention will be readily appreciated as the same becomes better understood by reference to the following detailed description when considered in connection with the accompanying drawings, wherein:

FIG. 1 is a cross-sectional side view of a conventional filter assembly known in the related art;

FIG. 2 is a cross-sectional side view of the filter assembly of the present invention;

FIG. 3 is a cross-sectional side view of the basket assembly supporting a bag-type filter of the present invention having a portion broken away to show the carriage;

FIG. 4 is a side view of the outer permeable member of the basket assembly of the present invention;

FIG. 4A is a top view of the outer permeable member illustrated in FIG. 4;

FIG. 5 is a side view of the inner permeable member of the basket assembly of the present invention;

FIG. 5A is a bottom view of the inner permeable member illustrated in FIG. 5;

FIG. 6 is a cross-sectional, schematic side view showing the assembly path of the inner permeable member received within the outer permeable member of the basket assembly of the present invention;

FIG. 7 is a cross-sectional schematic view of the basket assembly of the present invention;

FIG. 8 is a side view of the carriage of the present invention;

FIG. 8A is a top view of the carriage illustrated in FIG. 8;

FIG. 9 is a cross-sectional side view of one embodiment of the bag-type filter of the present invention;

FIG. 9A is a top view of the embodiment of the bag-type filter illustrated in FIG. 9;

FIG. 10 is a cross-sectional side view illustrating the physical orientation of one embodiment of the bag-type filter when it is in its assembled position on the basket assembly;

FIG. 11 is a cross-sectional schematic view illustrating the assembly path of the first embodiment of the bag-type filter onto the carriage showing the second portion of the bag-type filter received within the inner diameter of the carriage;

FIG. 12 is a schematic cross-sectional side view of the assembly path of the first embodiment of the bag-type filter onto the carriage showing the first portion of the bag-type filter folded over the outer diameter of the carriage;

FIG. 13 is a cross-sectional side view of another, second embodiment of the bag-type filter of the present invention;

FIG. 13A is a top view of the embodiment of the bag-type filter illustrated in FIG. 13;

FIG. 18 is a cross-sectional schematic view illustrating the assembly path of the second embodiment of the bag-type filter onto the carriage;

FIG. 19 is a schematic cross-sectional side view of the assembly path of the second embodiment of the bag-type filter onto the carriage showing the first portion of the bag-type filter received over the outer diameter of the carriage;

FIG. 20 is a schematic cross-sectional side view showing the assembly path of both embodiments of the bag-type filter supported on the carriage being slipped over the basket assembly; and FIG. 21 is a schematic cross-sectional side view illustrating the assembly of the carriage with the basket assembly supporting the bag-type filter.

DETAILED DESCRIPTION OF THE PREFERRED EMBODIMENT

Figure 14:
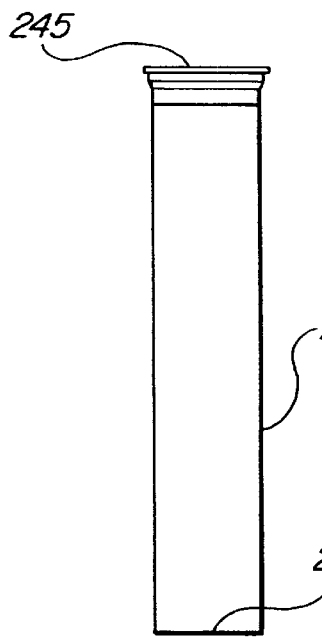
FIG. 14 is a cross-sectional side view of the first portion of the second embodiment of the bag-type filter of the present invention.

The present invention overcomes the deficiencies in the related art in a filter basket assembly having an extended surface area which is generally indicated at 110 in FIG. 2. The assembly 110 includes a vessel, generally indicated at 112, having an inlet 114, an outlet 116 and a filter chamber 118 defined therebetween. In the preferred embodiment, the filter chamber 118 is elongated and substantially cylindrical in shape. However, those having ordinary skill in the art will appreciate that the filter chamber 118 may be any geometric shape without departing from the scope of the invention. A cover 120 is removably mounted to the otherwise open top 122 of the vessel 112. A basket assembly, generally indicated at 124, is removably received in the chamber 118 through the top 122 of the vessel 112 and may be supported by any number of support mechanisms. For example, the basket assembly 124 may be supported by a support extending from the wall of the filter chamber 118; by suspending the basket assembly 124 from the upper lip at the top 122 of the vessel 112; or by a support which spaces the basket assembly 124 from the bottom 123 of the vessel 112. However and in the preferred embodiment, the basket assembly 124 is supported by a peripheral flange 126 extending radially inward from the inner side wall of the chamber 118 near the inlet 114. The basket assembly 124 has a diameter which is less than the diameter of the chamber 118 and together they define an outer annular flow passage 128. While the vessel 112 illustrated in the figures supports a single basket assembly 124, those having ordinary skill in the art will appreciate that the present invention is not limited to single basket vessels and may be employed with vessels supporting multiple basket assemblies and filters.

The basket assembly 124 will be described in greater detail with reference to FIGS. 3–7 of the drawings. Referring specifically to FIGS. 3, 4, 4A, 5 and 5A, the basket assembly 124 includes an outer substantially cylindrical, permeable member 130 and an inner substantially cylindrical, permeable member 132. However, those having ordinary skill in the art will appreciate that the inner and outer permeable members 130, 132 may take any geometric shape without departing from the scope of this invention. The outer permeable member 130 defines a pair of opposed, open ends 131, 133. The inner member 132 has one permeable arcuate end 134 and a flange 135 located at the opposite open end of the inner permeable member 132. The inner member 132 has a diameter which is less than the diameter of the outer member 130 and is received in the outer member 130 such that the flange 135 may be connected to the open end 133 as by welding with a continuous weld bead or any other suitable means as shown in FIGS. 6–7. The other open end 131 of the outer permeable member 130 is adapted to be received and supported by the peripheral flange 126 extending radially inward from the inner side wall of the chamber 118. Together, the inner and outer permeable members 132, 130, respectively, define an annular space 136 therebetween and an inner flow path 138 interior of the annular space 136. The inner and outer permeable members 132, 130 may be made of a permeable metal or plastic including stainless steel, wire mesh or any other suitable structure which allows fluid to pass therethrough but which is structurally capable of supporting a filter bag as will be described in greater detail below. In the preferred embodiment, the inner and outer permeable members 130, 132 are made of a 304 grade passivated stainless steel.

The assembly 124 may also employ a carriage, generally indicated at 140 in FIGS. 8 and 8A. In the preferred embodiment, the carriage 140 is elongated and substantially cylindrical in shape. However, those having ordinary skill in the art will appreciate that the carriage 140 may be any geometric shape without departing from the scope of the invention. Furthermore the carriage may take any shape which effectively accommodates the bag-type filter as described in greater detail below. The carriage 140 has a pair of opposed open ends 141, 143 with a plurality of annularly spaced rods 145 extending therebetween. In the preferred embodiment, the rods 145 are ¼ inch in diameter and are made of 304 grade stainless steel. Because of the structure of its preferred embodiment and its appearance as illustrated in FIG. 8, the carriage 140 is often referred to as a "wire" carriage.

The wire carriage 140 is a tool used to insert the extended bag-type filter into the basket assembly 124. One embodiment of the extended bag-type filter of the present invention is generally indicated at 142 in FIGS. 9–10 and another embodiment is generally indicated at 242 in FIGS. 13–14. In the first preferred embodiment, the filter 142 is substantially cylindrical in shape and has a first portion 144 having a first, larger diameter, a second portion 146 having a second, reduced diameter and a transition portion 148 disposed therebetween. The transition portion 148 may be formed merely by a reduction in the diameter of the extended area filter. Alternatively, the transition portion 148 may take the form of a circular piece of filter material which defines an inner diameter 152 and an outer diameter 154. The transition portion 148 is attached to the first portion 144 of the filter 142 at the outer diameter 154 of the transition portion 148. Similarly, the transition portion 148 is also attached to the second portion 146 of the filter 142 at the inner diameter 152 of the transition portion 148. The filter 142 also has an arcuate closed end 150 and an open end 151 defined by an annular ring which is located opposite the closed end 150 when the filter 142 is in and extended position as illustrated in FIG. 9. On the other hand, the arcuate closed end 150 is positioned adjacent the open end 151 when the filter is in its assembled position as illustrated in FIG. 10. The filter element 142 may be disposable, non-reusable and may be manufactured from needled felt, meshes or any other material which provides a mechanical straining effect on the fluid. In the preferred embodiment, the filter 142 is made of a micron rated fabric which may provide, for example, six to seven square feet of filtration surface area in the approximate proportional size depicted in these Figures. However, those having ordinary skill in the art will appreciate that the area of the filtration surface of any given filter 142 will vary with the size of the vessel 112 and basket assembly 124.

As shown in FIGS. 11–12 in connection with the first embodiment of the filter 142, the second portion 146 is received within the inner diameter defined by the cylindrical wire carriage 140. The first portion 144 of the bag-type filter 142 is then folded over the outer diameter of the wire carriage 140. The transition portion 148 facilitates this step and bridges one annular open end 141 of the wire carriage 140 between its inner and outer diameter.

Figure 15:
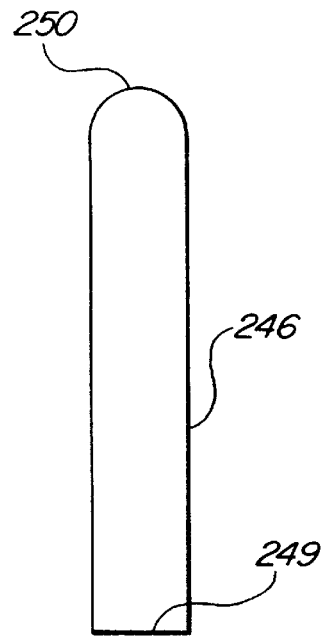
FIG. 15 is a cross-sectional side view of the second portion of the second embodiment of the bag-type filter of the present invention.

On the other hand, the wire carriage 140 may also be used in conjunction with an alternative, second embodiment of the extended, bag-type filter generally indicated at 242 in FIGS. 13 and 13A. The alternate embodiment of the filter 242 enjoys the advantage that it is easy to manufacture. Like that of the first embodiment, in the second preferred embodiment, the filter 242 is substantially cylindrical in shape and has an outer, first portion 244, shown in FIG. 14, having a first, larger diameter; a second portion 246, shown in FIG. 15, having a second, reduced diameter; and a transition portion 248, generally shown in FIGS. 16–17, disposed therebetween. The first portion 244 includes a pair of opposed, open ends 245, 247. The second portion 246 includes one open end 249 and an arcuate, closed end 250. The open end 245 of the first portion 244 is defined by an annular ring which is positioned about the arcuate, closed end 250 when the filter 242 is in its assembled position as illustrated in FIG. 13.

Figure 16:
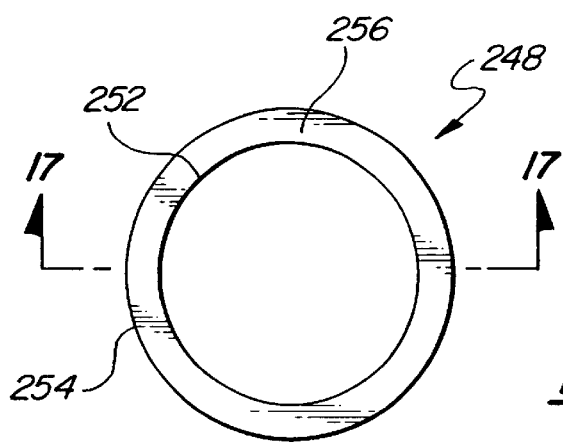
FIG. 16 is an elevated top view of the transition portion of one preferred embodiment of the bag-type filter of the present invention.
Figure 17:
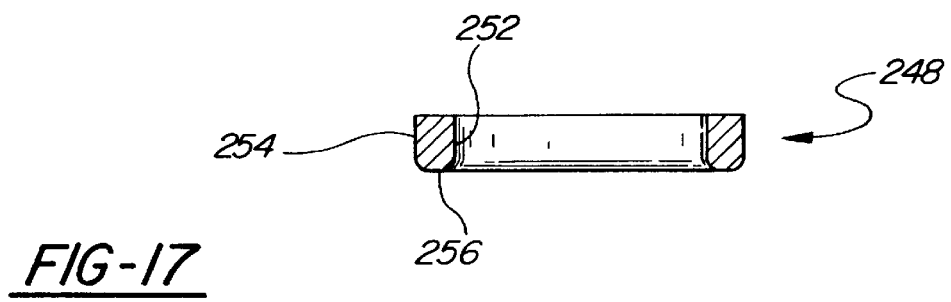
FIG. 17 is a cross-sectional side-view taken substantially through section A—A of FIG. 16.

Referring specifically to FIGS. 16–17, the transition portion 248 is substantially U-shaped in cross-section having an annular, inner flange 252; an annular, outer flange 254; and an arcuate, bridge portion 256 formed therebetween. On end 247 of the first portion 244 is attached to the outer flange 254. Similarly, one end 249 of the second portion 246 is attached to the inner flange 252 by any manner, including, but not limited to, gluing, heat setting, sewing, crimping, or any mechanical or chemical method known in the art or yet to be discovered. The transition portion 248 has a relatively high stiffness or rigidity relative to the filter 242 and is preferably one piece and made from molded polyethylene. However, the transition portion 248 may be formed in a number of ways including, for example, by two L-shaped members bonded together.

Those having ordinary skill in the art will recognize that the transition portion 248 may be formed in many ways. For example, the first portion 244 and the second portion 246 may be attached in a number of ways such as by sewing, glueing, laser welding or otherwise heat sealed, or crimped together. In any event, the filter element 242 is disposable and non-reusable and may be manufactured from needled felt, meshes, or any other material which provides a mechanical straining effect on the fluid. In the preferred embodiment, the filter 242 is made of a micron rated fabric which may provide, for example six to seven square feet of filtration surface area in the approximate proportional size depicted in these figures. However, those having ordinary skill in the art will appreciate that the area of the filtration surface of any given filter 242 will vary with the size of the vessel 112 and of the basket assembly 124.

As shown in FIGS. 18–19, the second portion 246 is received within the inner diameter defined by the cylindrical wire carriage 140. The first portion 244 of the bag-type filter 242 is received over the outer diameter of the wire carriage 140. The transition portion 248 bridges one annular open end 141 of the wire carriage 140 between its inner and outer diameter.

As shown in FIGS. 20–21, the wire carriage 140 supporting the filter 142, 242 of either embodiment is then flipped 180° such that it may be received within the annular space 136 formed between the inner 132 and outer 130 members of the basket assembly 124 and such that the closed end 150, 250 of the filter is cooperatively engaged by the permeable arcuate end 134 of the inner member 132. The basket assembly 124 is then inserted into the chamber 118 of the vessel 112 as shown in FIG. 2. The wire carriage 140 may then be removed. Alternatively, the wire carriage 140 may be used solely to insert the filter 142, 242 into the basket assembly 124. However, those having ordinary skill in the art will appreciate that the wire carriage is not essential and that the filter 142, 242 could be properly fitted about the basket assembly 124 without it.

As best shown in FIG. 2, dirty fluid shown shaded in FIG. 2 enters the vessel 112 through the inlet 114 as indicated by the arrows A. The dirty fluid then enters the annular space 136 between the inner and outer permeable members 132, 130 of the basket assembly 124 as indicated by the arrows B. In most operational environments, the dirty fluid will fill the annular space 136 until it is at or above the permeable, arcuate end 134 of the inner member 132. The dirty fluid then passes through the basket assembly 124 through the filters 142, 242 and into either the outer, annular flow passage 128 or the inner flow path 138 as indicated by the arrows C. Clean fluid then exits the filter chamber 118 through the outlet 116, as indicated by the arrows D.

The dirty fluid passes through the filter 142, 242 just once, but the effective surface area of the filter 142, 242 has been doubled through the use of a bag-type filter 142, 242 having first portions 144, 244 and second portions 146, 246 supported by the wire carriage 140 about both the inner and outer baskets 132, 130. Because of its extended filter surface area, the present invention may be employed to at least double the useful life of the bag-type filter without any substantial increase in costs while, at the same decreasing the pressure drop ($\Delta P$) of the fluid through the vessel. More specifically, beta site testing of the filter assembly of the present invention has revealed that an extended area bag type filter of the present invention having approximately double the surface area over a comparable conventional filter subjected to the same flow rate results in three to four times the useful filter life over a conventional filter. This is because the impact velocity of the solid particles in the dirty fluid against the extended area filter is reduced by approximately ½ when compared to conventional filter assemblies. In addition, use of the extended area filter assembly of the present invention reduces the initial pressure drop ($\Delta P$) by approximately ½ when compared to the initial pressure drop across conventional filter assemblies. Alternatively, the size of the vessel may be reduced by employing the filter assembly of the present invention while maintaining the same respective useful life of the filter. Smaller vessels reduce the plant space required for these filtering systems. Finally, the extended area bag-type filter of the present invention is inexpensive, cost-efficient and is easy to use in the field.

The invention has been described in an illustrative manner. It is to be understood that the terminology which has been used is intended to be in the nature of words of description rather than of limitation. Many modifications and variations of the invention are possible in light of the above teachings. Therefore, the invention may be practiced other than as specifically described.

I claim:

1. A filter assembly comprising:
  a filter vessel having an inlet, an outlet and defining a filter chamber therebetween;
  a basket assembly removably supported within said filter chamber and having a diameter less than the diameter of said filter chamber so as to define an annular flow passage about said basket assembly;
  said basket assembly including an outer permeable member and an inner permeable member having a diameter which is less than the diameter of said outer permeable member such that said inner permeable member is received within said outer permeable member so as to define an annular space therebetween and an inner flow path, said inner permeable member also including a permeable arcuate end;
  said basket assembly being capable of supporting a bag type filter having at least one closed end such that the bag type filter may be supported over both said inner and outer permeable members bounding said annular space therebetween and the closed end of the bag type filter may be supported by the corresponding arcuate end of said inner permeable member.

2. A filter assembly as set forth in claim 1 wherein said inner and outer permeable members cooperate to define an annular space therebetween and an inner flow path interior of the annular space through which fluid flows after passing through said bag-type filter.

3. A filter assembly as set forth in claim 1 wherein said outer permeable member defines a pair of opposed, open ends, said inner member including a flange located at the open end of said inner permeable member opposite said arcuate end, said flange adapted to be connected to at least one of said pair of open ends of said outer permeable member.

4. A filter assembly as set forth in claim 3 wherein said filter vessel includes a peripheral flange extending radially inward from the inner side wall of said filter chamber, the other of said pair of open ends of said outer permeable member is adapted to be received and supported by said peripheral flange.

5. A filter assembly as set forth in claim 1 wherein said inner and outer permeable members are made of a permeable material which allows fluid to pass therethrough but which is structurally capable of supporting said bag-type filter.

6. A filter assembly as set forth in claim 5 wherein said inner and outer permeable members are made of a 304 grade passivated stainless steel.

7. A filter assembly as set forth in claim 1 wherein said assembly includes a carriage used to mount said bag-type filter relative to said inner and outer permeable members.

8. A filter assembly as set forth in claim 7 wherein said carriage includes a pair of opposed open ends with a plurality of annularly spaced rods extending therebetween so as to define an elongated hollow cylinder having an inner diameter and an outer diameter.

9. A filter assembly as set forth in claim 8 further including a bag-type filter, said bag-type filter includes a first portion having a first larger diameter, a second portion having a second reduced diameter and a transition portion disposed therebetween, said second reduced diameter portion of said bag-type filter adapted to be received within said hollow elongated cylinder defined by said carriage, said first larger diameter portion of said bag-type filter adapted to be folded over the outer diameter of said cylindrical carriage and said transition portion adapted to bridge either one of said opposed open ends of said carriage.

10. A filter assembly as set forth in claim 9 wherein said second, reduced diameter portion of said bag-type filter includes an arcuate, closed end, said first, larger diameter portion having an open end, said arcuate, closed end of said second, reduced diameter portion being positioned adjacent said open end of said first, larger diameter portion when the bag-type filter is supported by said basket assembly.

11. A basket assembly adapted to be removably supported within a chamber of a filter vessel, said basket assembly comprising:
  an outer permeable member and an inner permeable member having a diameter which is less than the diameter of said outer permeable member such that said inner permeable member is received within said outer permeable member so as to define an annular space therebetween and an inner flow path, said inner permeable member also including a permeable arcuate end;

said basket assembly being capable of supporting a bag type filter having at least one closed end such that the bag type filter may be supported over both said inner and outer permeable members bounding said annular space therebetween and the closed end of the bag type filter may be supported by the corresponding arcuate end of said inner permeable member.

12. A basket assembly as set forth in claim 11 wherein said inner and outer permeable members cooperate to define an annular space therebetween and an inner flow path interior of the annular space through which fluid flows after passing through said bag-type filter.

13. A basket assembly as set forth in claim 11 wherein said outer permeable member defines a pair of opposed, open ends, said inner member including a flange located at the open end of said inner permeable member opposite said arcuate end, said flange adapted to be connected to at least one of said pair of open ends of said outer permeable member.

14. A basket assembly as set forth in claim 13 wherein said filter vessel includes a peripheral flange extending radially inward from the inner side wall of said filter chamber, the other of said pair of open ends of said outer permeable member is adapted to be received and supported by said peripheral flange.

15. A basket assembly as set forth in claim 11 wherein said inner and outer permeable members are made of a permeable material which allows fluid to pass therethrough but which is structurally capable of supporting said bag-type filter.

16. A basket assembly as set forth in claim 15 wherein said inner and outer permeable members are made of a 304 grade passivated stainless steel.

17. A basket assembly as set forth in claim 11 wherein said assembly includes a carriage used to mount said bag-type filter relative to said inner and outer permeable members.

18. A basket assembly as set forth in claim 17 wherein said carriage includes a pair of opposed open ends with a plurality of annularly spaced rods extending therebetween so as to define an elongated hollow cylinder having an inner diameter and an outer diameter.

19. A basket assembly as set forth in claim 18, including a bag-type filter, said bag-type filter includes a first portion having a first larger diameter, a second portion having a second reduced diameter and a transition portion disposed therebetween, said second reduced diameter portion of said bag-type filter adapted to be received within said hollow elongated cylinder defined by said carriage, said first larger diameter portion of said bag-type filter adapted to be folded over the outer diameter of said cylindrical carriage and said transition portion adapted to bridge either one of said opposed open ends of said carriage.

20. A basket assembly as set forth in claim 19 wherein said second, reduced diameter portion of said bag-type filter includes an arcuate, closed end, said first, larger diameter portion having an open end, said arcuate, closed end of said second, reduced diameter portion being positioned adjacent said open end of said first, larger diameter portion when the bag-type filter is supported by said basket assembly.

* * * * *